United States Patent [19]

Honda

[11] Patent Number: 4,779,501

[45] Date of Patent: Oct. 25, 1988

[54] ADAPTER FOR POSITIONING A FLUORESCENT

[76] Inventor: Hirosi Honda, 24-15, Midorigaoka 2-Chome, Kushiro-shi, Japan

[21] Appl. No.: 872,013

[22] Filed: Jun. 9, 1986

Related U.S. Application Data

[62] Division of Ser. No. 705,527, Feb. 26, 1985, Pat. No. 4,611,512.

[51] Int. Cl.⁴ ........................ B23D 19/00

[52] U.S. Cl. ........................ 83/487; 29/760; 29/271; 29/281.1

[58] Field of Search ................ 29/760, 235, 237, 270, 29/271, 272, 281.1; 83/53.1

[56] References Cited

U.S. PATENT DOCUMENTS 4,581,481 4/1986 Moretti ........................ 29/235 X

*Primary Examiner*—Timothy V. Eley

*Attorney, Agent, or Firm*—Stevens, Davis, Miller & Mosher

[57] ABSTRACT

A fluorescent lamp can be installed in or detached from a high installation position by a device comprising: a lamp supporting member having a trough-like interior for accommodating the lamp; an elongatable rod connected to the lamp supporting member and being held at its lower part by hand for raising or lowering the lamp to or from the installation position; bag members disposed in the trough-like interior of the lamp supporting member on one lateral side thereof and being expanded and contracted by a fluid supplied thereinto and discharged therefrom thereby to gently but firmly holding the lamp against a support member on the other lateral side and releasing the lamp; and a controllable pump mechanism for thus supplying and discharging the fluid.

3 Claims, 10 Drawing Sheets

FIG.6
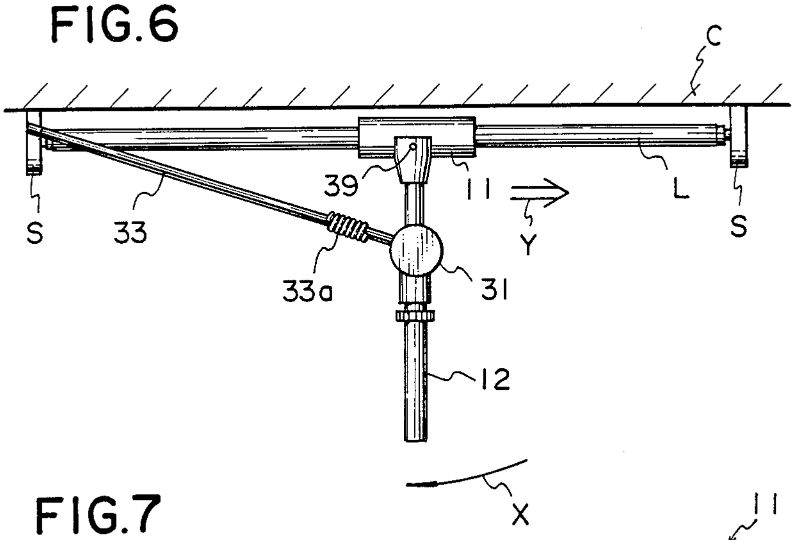
FIG.7
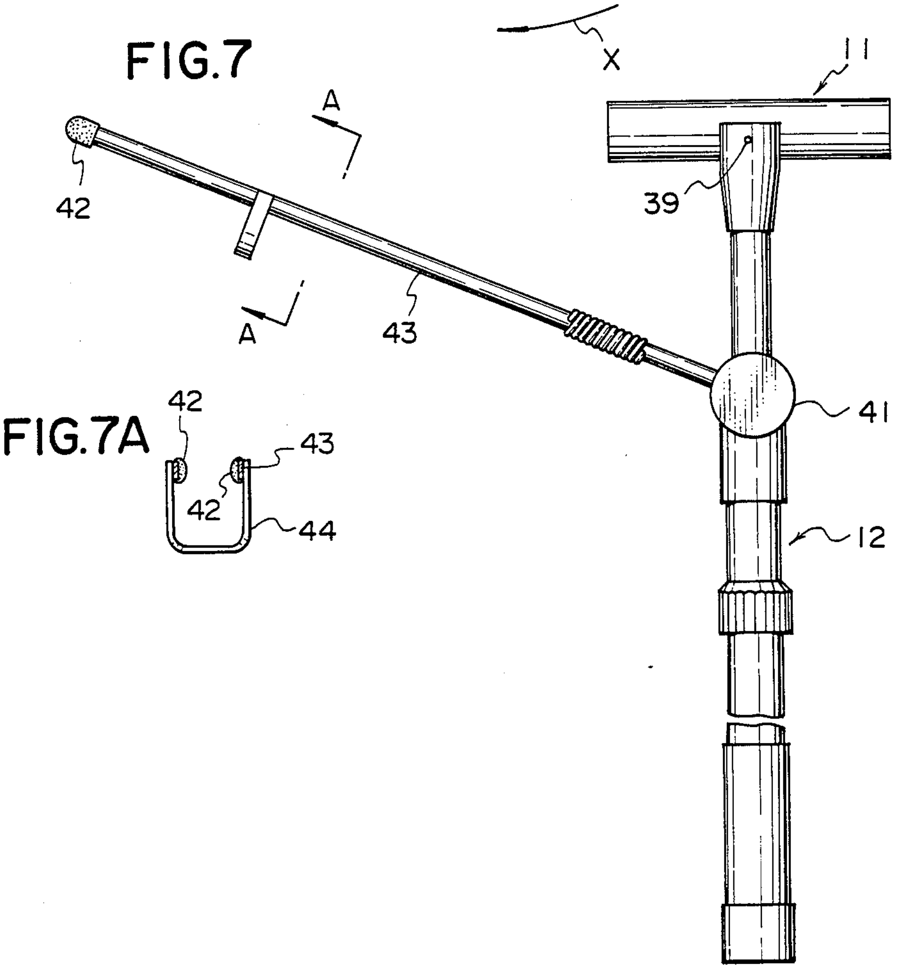
FIG.7A

FIG. 10
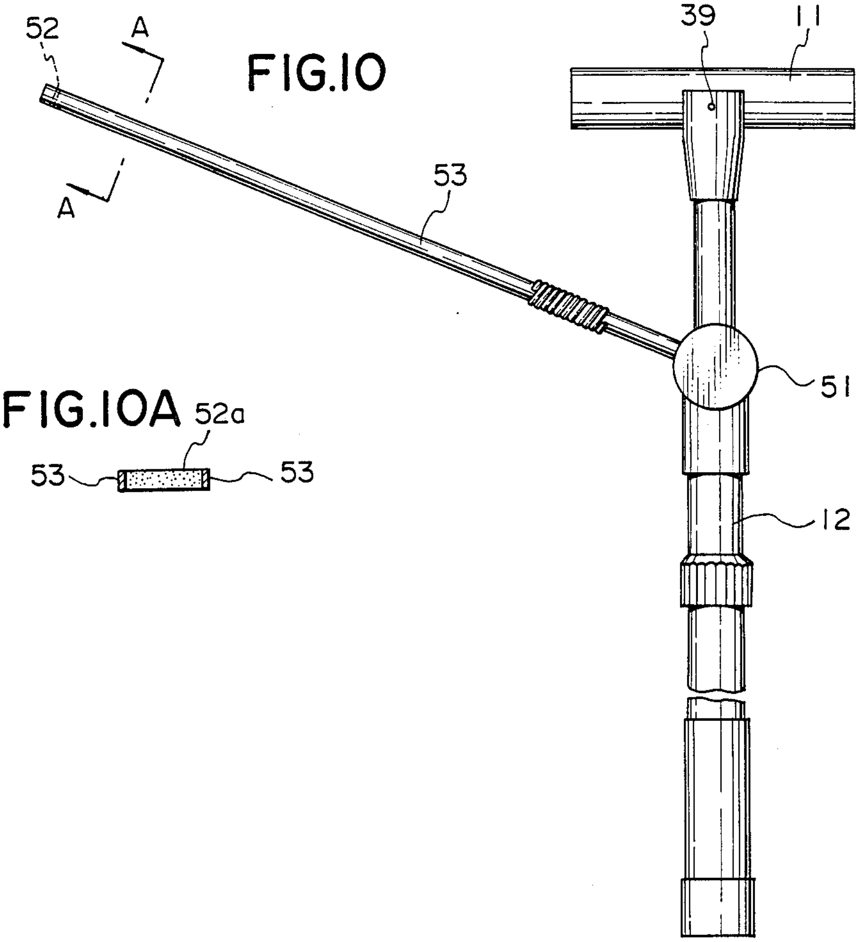
FIG. 10A
FIG. 11
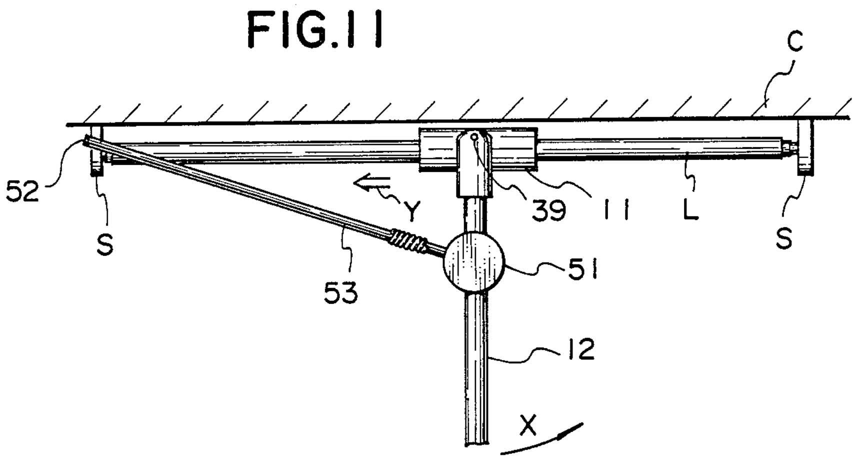

ADAPTER FOR POSITIONING A FLUORESCENT

This is a division of application Ser. No. 705,527 filed Feb. 26, 1985 now U.S. Pat. No. 4,611,512.

BACKGROUND OF THE INVENTION

The present invention relates to a device for replacing a fluorescent lamp.

There have been devised and demonstrated various devices for replacing an old fluorescent lamp installed at a high position such as a ceiling with a new fluorescent lamp in a safe and simple manner. In general, these devices each comprise a supporting member adapted to support a fluorescent lamp in the axial direction thereof, a supporting rod having a length sufficient for raising the supporting member to an elevated position at which a fluorescent lamp is installed, and a mechanism for causing the supporting member to clamp and support the fluorescent lamp.

In the conventional devices of the type described, springs are used to produce the force required for clamping and supporting the fluorescent lamp. As a result, there arise some problems such as the difficulty of producing an optimum force for clamping and supporting the fluorescent lamp and complicated nature of the mechanism for causing the supporting member to clamp and support the fluorescent lamp. Furthermore, because of the construction of the operating mechanism, it is difficult to design and construct a supporiing rod which can be extended or retracted so that a fluorescent lamp installed at a high or low position can be removed or a fluorescent lamp can be installed at a high or low position. In general, the supporting rods have a fixed length and even in the case of a height-adjustable supporting rod, the adjustable range is limited within one meter. Moreover, the supporting member and the operating mechanism are relatively large in size so that the device for replacing a fluorescent lamp cannot be moved and handled in a convenient manner. In addition, there arises the problem of the difficulty of manipulating the device for replacing a fluorescent lamp because the upper portion (head) thereof is heavy.

As described above, the conventional devices for replacing a fluorescent lamp have the problems of difficult manipulation; inconvenience in moving or handling; and difficulty in replacing a fluorescent lamp installed at a high position (for instance, in excess of four meters).

SUMMARY OF THE INVENTION

The present invention was made to overcome the above and other problems encountered in the conventional devices for replacing a fluorescent lamp. One of its objects is to provide a device which can be manipulated in a simple yet highly reliable manner so that a fluorescent lamp installed at a high position can be removed or a fluorescent lamp can be installed at a high position.

Briefly stated, the present invention provides a device for replacing a fluorescent lamp comprising a fluorescent lamp supporting member having a substantially U-shaped cross-sectional shape, an elongatable supporting rod connected to the fluorescent lamp supporting member, expandable and retractable bag members disposed in the fluorescent lamp supporting member, a pump mechanism for supplying a fluid to the bag members, and a fluid supply line for intercommunicating between the bag members and the pump mechanism. The pump mechanism is driven to supply a fluid to the bag members so that the bag members are inflated, thereby clamping a fluorescent lamp while the supporting rod is manipulated so as to remove or install the fluorescent lamp.

The above and other objects, further features, and advantages of the present invention will become more apparent from the following detailed description of some preferred embodiments thereof when read in conjunction with the accompanying drawings.

BRIEF DESCRIPTION OF THE DRAWINGS

FIG. 6 is a view used to explain the mode of operation of the same device;

FIG. 7 is a front view of a third embodiment of the present invention;

FIG. 7A is a sectional view taken along the line A—A of FIG. 7;

FIG. 10 is a front view of a fourth embodiment of the present invention;

FIG. 10A is a sectional view taken along the line A—A of FIG. 10;

FIG. 11 is a view used to explain the mode of operation of the device shown in FIG. 10;

The same reference numerals are used to designate the same or similar parts throughout the figures.

DESCRIPTION OF THE PREFERRED EMBODIMENTS

Figure 1:
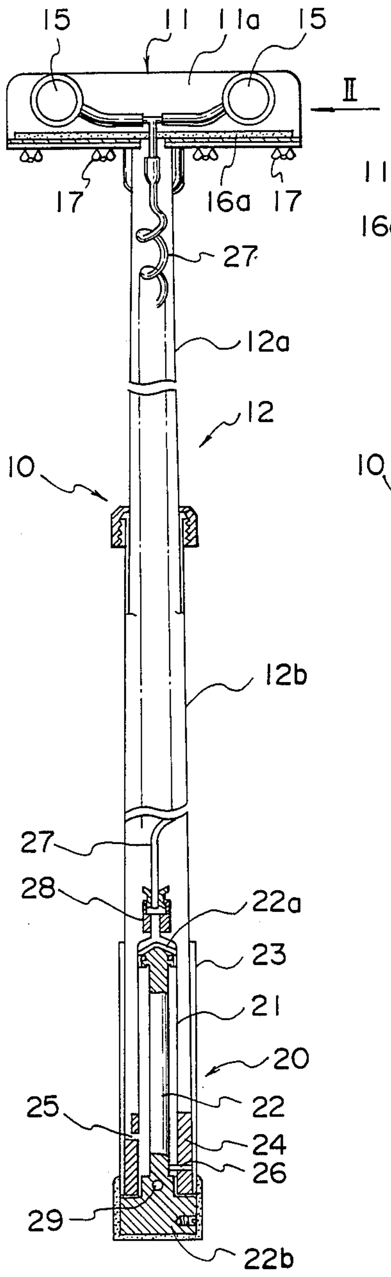
FIG. 1 is a front view in longitudinal section of a first embodiment of a device for replacing a fluorescent lamp in accordance with the present invention.
Figure 2:
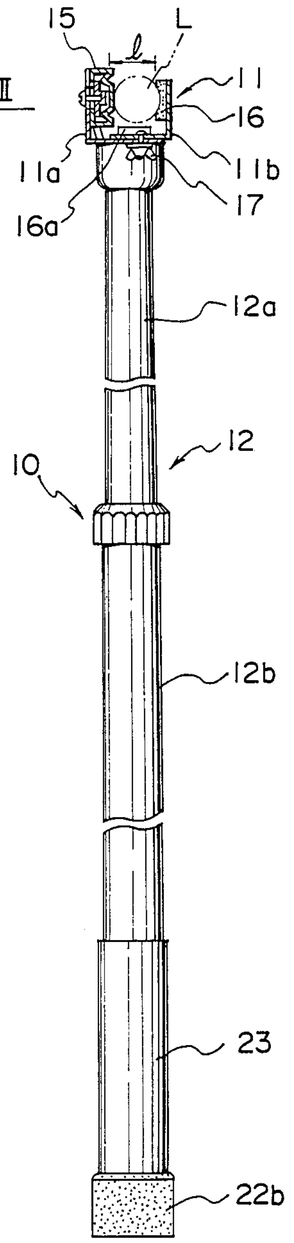
FIG. 2 is a side view thereof.

First Embodiment, FIGS. 1 and 2

Referring to FIGS. 1 and 2, a first embodiment of the present invention will be described. FIG. 1 is a front view, in longitudinal section, of the first embodiment while FIG. 2 is a side view thereof. A fluorescent lamp supporting frame 11 having a longitudinal length sufficient to support a fluorescent lamp and having a substantially U-shaped or channel-shaped cross-sectional profile is provided at the top of the device. The upper end of a supporting rod generally indicated by the reference numeral 12 is securely fixed to the bottom of the supporting frame 11 at its middle part. The supporting rod 12 comprises a plurality of hollow tubes 12*a* and 12*b* of different diameters, the tube 12*a* being telescopically inserted into the tube 12*b*. The supporting rod 12 has such a length that when an operator holds the supporting rod 12 in his hands and raises it, the supporting frame 11 can reach a position where a luorescent lamp is to be replaced.

Bag members 15 which are made of rubber and are expandable and contractable are disposed on one inner side wall of the supporting frame 11 of the channel-shaped cross-sectional profile, and supporting member 16 with a V-shaped recess is disposed on the other inner side wall of the supporting frame 11 in opposed relationship to the bag members 15.

The channel-shaped supporting frame 11 comprises two L-shaped or angle members 11*a* and 11*b* with their bottom or horizontal portions overlapped and joined to each other by means of adjusting screws and nuts 17. A rubber seal 16*a* is disposed over the top surface of the horizontal portion of one L-shaped member 11*b*.

A pump mechanism 20 which is adapted to supply a fluid such as air to the bag members 15 is mounted at the lower portion of the supporting rod 12 and comprises, in general, a hollow cylinder 21 which is disposed in the supporting rod 12 at the lower end portion thereof in such a way that the open end of the hollow cylinder 21 is directed downward and a piston 22 which is reciprocably inserted into the hollow cylinder 21. The upper end of the piston 22 terminates in an enlarged head 22*a* which is connected to a base portion 22*b* of the piston 22 by an elongated rod. An outer cylinder 23 of the pump 22 which has an inner diameter greater than the outer diameter of the lower end portion of the supporting rod 12 and which has an open upper end is securely fitted around the base portion 22*b* of the piston 22. The outer cylinder 23 is slidably fitted around the lower end portion of the supporting rod 12.

An annular member or a short cylindrical member 24 is fixedly interposed between the hollow cylinder 21 and the supporting rod 12 so that the hollow cylinder 21 is securely held in position relative to the cylinder 21. The annular member 24 is formed near the upper end thereof with an air vent hole 25, which is communicated with the interior of the hollow cylinder 21 and a stop 26 is extended through the annular member 24 near the lower end thereof and into the hollow cylinder 21.

The hollow cylinder 21 and the bag members 15 are communicated with each other through a fluid supply pipe 27 which is extended through the supporting rod 12 in the form of a coil. The fluid supply pipe 27 is connected at its lower end to the hollow cylinder 21 by a rotary or swivel connector 28 so that the fluid supply pipe 27 is prevented from being twisted.

A radial pin 29 is extended through the base portion 22*b* of the piston 22 in a radial direction perpendicular to the axis of the piston 22 and is in engagement with an L-shaped groove (not shown) of the annular member 24 so that the end of the upward stroke of the piston 22 is limited.

Next the mode of operation of the device 10 for replacing a fluorescent lamp of the above described construction will be described.

(a) Removal of a fluorescent lamp

First the adjusting nuts 17 are loosened and then the two L-shaped members 11*a* and 11*b* are caused to slide toward or away from each other so as to determine the width l of the supporting frame 11 depending upon the outer diameter of a fluorescent lamp L to be replaced. Thereafter the supporting rod 12 is extended to a suitable length so that the supporting frame 11 can engage with the fluorescent lamp L. Next the outer cylinder 23 of the pump is moved downward so that the piston 22 is withdrawn from the hollow cylinder 21 until the head 22*a* of the piston 22 engages with the stop 26. As a result, the air in the bag members 15 is evacuated so that the bag members 15 are contracted, and the hollow cylinder 21 is communicated with the surrounding atmosphere through the air vent hole 25.

Under these conitions, the supporting frame 11 is raised so that the fluorescent lamp L is clamped between the bag members 15 and the supporting member 16 as best shown in FIG. 2. Next the outer cylinder 23 is moved upward so that the piston 22 is forced into the hollow cylinder 21. Then the air flows through the fluid supply pipe 27 into the bag members 15 so that the bag members 15 are inflated. When the outer cylinder 23 is rotated after it has been moved upward, the radial pin 29 engages with the L-shaped groove (not shown) of the annular member 24 so that the piston 22 is maintained at the end of its upward stroke. Since the bag members 15 are inflated, the fluorescent lamp L is securely clamped between the bag members 15 and the supporting member 16.

Then the supporting rod 12 is so operated that the supporting frame 11 is moved in the axial direction of the fluorescent lamp L, whereupon one of the sockets which support the ends of the fluorescent lamp L is pushed by one end of the fluorescent lamp L, whereby the other end of the fluorescent lamp L is separated from the other socket. After the fluorescent lamp L has been removed in this manner and securely held in the hands of an operator, the outer cylinder 23 is so operated as to withdraw the piston 22 from the hollow cylinder 21. Then the air in the bag members 15 is evacuated so that the bag members 15 are contracted and consequently the fluorescent lamp L is released.

(b) Attachment of a fluorescent lamp

In order to attach a fluorescent lamp, the above-described steps fr removing a fluorescent lamp are reversed. That is, a new fluorescent lamp is inserted between the bag members 15 and the supporting member 16 of the supporting frame 11 and firmly clamped between them when the bag membrs 15 are inflated in a manner substantially similar to that described above. Thereafter the operator raises the supporting rod 12 so that the fluorescent lamp is attached between a pair of sockets. Thereafter the outer cylinder 23 is so operated as to withdraw the piston 22 from the hollow cylinder 21, whereby the fluorescent lamp is released from the bag members 15 and the supporting member 16.

After an old fluorescent lamp has been removed and then a new fluorescent lamp is attached in the manner described above, the supporting rod 12 is shortened and the device for replacing a fluorescent lamp may be brought to the next replacement position or put into a storage space.

As described above, according to the first embodiment of the present invention, a fluorescent lamp can be securely clamped with a uniform pressure by inflating the bag members 15, the clamping mechanism comprising the bag members 15 filled with a fluid (air). Therefore the device for replacing a fluorescent lamp in accordance with the present invention is simple in construction and light in weight. Furthermore, the supporting rod 12 is also simple in construction and light in weight because only the pump mechanism 20 and the flexible fluid supply pipe 27 are disposed within the supporting rod 12. Moreover, the ratio between the length of the fully extended supporting rod 12 and the length of the shortened supporting rod 12 can be made higher. Thus the present invention can provide a device for replacing a fluorescent lamp which can be manipulated in a simple yet reliable manner and is compact in size, light in weight, and inexpensive to manufacture. The device for replacing a fluorescent lamp in accordance with the present invention is advantageous especially when it is used to replace a fluorescent lamp installed at a high place. So far the supporting rod 12 has been described as comprising two telescopic hollow pipes, but it is to be understood that it may comprise more than two telescopic hollow pipes.

Only one pump mechanism 20 is disposed at the lower end portion of the supporting rod 12 so that the construction can be made simple, and the supporting rod 12 can be amply shortened. Furthermore, the pump mechanism 20 can be operated by reciprocating the outer cylinder 23 so that it can be operated by one hand. As a result, the replacement of an old fluorescent lamp with a new one can be accomplished in a very simple manner.

Second Embodiment, FIGS. 3 through 6

A second embodiment of this invention is substantially similar in construction to the first embodiment thereof described above with reference to FIGS. 1 and 2 except that an auxiliary rod is further provided in order to facilitate the replacement of a fluorescent lamp.

Figures 3, 4, 5:
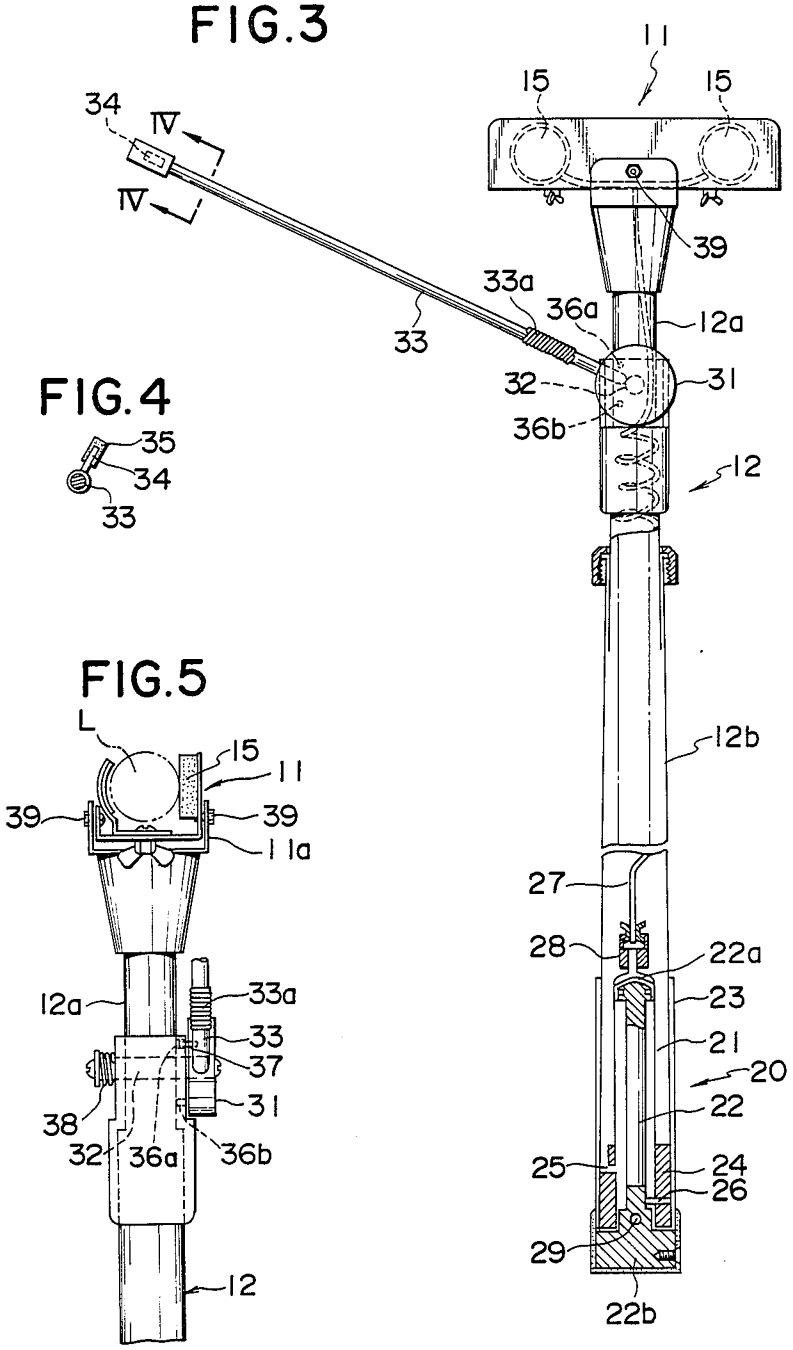
FIG. 3 is a front view, partially in longitudinal section, of a second embodiment of the present invention.
FIG. 4 is a sectional view taken along the line IV—IV of FIG. 3.
FIG. 5 is a partial side view illustrating the upper portion of the device shown in FIG. 3.

Referring to FIGS. 3 through 6, a disk-shaped knob 31 is rotatably attached with a pin 32 to the upper portion of the supporting rod 12, and the lower end of an auxiliary rod 33 is securely attached to the disk-shaped knob 31 in such a way that the axis of the auxiliary rod 33 is perpendicular to the axis of the pin 32. The length of the auxiliary rod 33 is so selected that the upper end of the auxiliary rod 33 can reach the position of a socket which receives the pins of a fluorescent lamp. As best shown in FIG. 4, a push member 34 is securely attached to the outer or distal end of the auxiliary rod 33 in such a way that the axis of the push member 34 is perpendicular to the axis of the auxiliary rod 33. A rubber cover 35 is fitted over the push member 34. A section of the auxiliary rod 33 near its inner or proximal end consists of a coiled spring **33*a* so that when a force is exerted on the auxiliary rod 33 in the transverse direction thereof, the auxiliary rod 33 can bend at the spring section 33*a* and consequently the engagement between the upper end of the auxiliary rod 33** and a socket for receiving the pins of a fluorescent lamp can be always maintained at a specific point.

A positioning pin 37 is extended from the inner major surface (in opposed relationship with the supporting rod 12) of the disk-shaped knob 31, and the supporting rod 12 is provided with two positioning holes **36*a* and 36*b*. A compression coil spring 38 is fitted around the pin 32 between one end thereof and the supporting rod 12 as best shown in FIG. 5 so that disk-shaped knob 31 is normally pressed against the supporting rod 12**.

In this embodiment of the invention, the supporting frame 11 is pivotably supported with coaxial pins 39 by a channel-shaped yoke member **11*a* which in turn is securely joined to the upper end of the supporting rod 12**.

Next, the mode of operation of this second embodiment of the invention of the above described construction will be described.

FIG. 6 shows the operation for replacing a fluorescent lamp L by using this second embodiment of the present invention. Sockets S which support theends of the fluorescent lamp L and are adapted to supply the power thereto are suspended from a ceiling C.

In order to remove the fluorescent lamp L attached to the ceiling C, the operator first rotates the disk-shaped knob 31 to insert the positioning pin 37 into the upper positioning hole **36*a* so that, as best shown in FIG. 3, the auxiliary rod 33 can be securely maintained in a raised position. Thereafter the operator raises the supporting rod 12 so that the supporting frame 11 engages with the fluorescent lamp L, and the push member 34 at the distal end of the auxiliary rod 33 engages with the inner surface of one of the sockets S. Next the operator swings the supporting rod 12 in the direction indicated by the arrow X in FIG. 6, so that the fluorescent lamp L is caused to move in the direction indicated by Y in FIG. 6 because the push member 34 is kept in engagement with the inner surface of the socket S. As a result, the left end (as viewed in FIG. 6**) of the fluorescent lamp L is separated from the left socket S, and the fluorescent lamp L can now be removed easily.

Next the steps for attaching a new fluorescent lamp will be described. First the operator clamps a new fluorescent lamp between the bag members 15 and the supporting member 16 in a manner substantially similar to that described above in such a way that the upper end of the auxiliary rod 33, which is maintained in the raised position as shown in FIGS. 3 or 6, is spaced apart from the corresponding end of the fluorescent lamp L by a specific distance and that the pins of the fluorescent lamp L are aligned with the corresponding pin holes of the socket S. Next the operator raises the supporting rod 12 so that the fluorescent lamp L is brought almost to its installation position, and the push member 34 at the upper end of the auxiliary rod 33 is placed in engagement with the inner surface of the left socket S. Under these conditions, the operator inserts the pins extending from the right end (as viewed in FIG. 6) of the fluorescent lamp L into the corresponding pin holes of the right socket S. Thereafter the operator swings the supporting rod 12 in the direction X in FIG. 6 so that the fluorescent lamp L is caused to move in the direction Y. Then the gap between the left socket S and the left end of the fluorescent lamp L is increased so that the fluorescent lamp L can be easily interposed between the sockets S. After the left end of the fluorescent lamp L has been correctly aligned with the left socket S, the operator returns the supporting rod 12 to its initial position so that the fluorescent lamp L is securely held between the sockets.

As described above, according to the second embodiment of the present invention, a fluorescent lamp can be easily removed from or attached to the sockets extended from a flat stationary surface such as a ceiling C. Especially, the higher the ceiling is, the less the displacement of the supporting rod 12 becomes, and the removal or attachment of a fluorescent lamp can be accomplished in a simple manner with less force. Even when a fluorescent lamp is of the suspended type; that is, even when the sockets for a fluorescent lamp are attached to a movable surface, one of the sockets can be used as a fixed point for producing a force causing the movement of a fluorescent lamp in the axial direction thereof. As a result, the removal or attachment of a fluorescent lamp can also be accomplished easily. Furthermore, the second embodiment of the present invention may be equally used even when a plurality of fluorescent lamps are arranged in parallel with each other, or even if their sockets are embedded in a ceiling.

Moreover, when the disk-shaped knob 31 is so rotated as to insert the positioning pin 37 into the lower positioning hole 36*b*, the auxiliary rod 33 can be brought to a position substantially in parallel with the supporting rod 12. It is therefore easy to carry the device for replacing a fluorescent lamp or to put it into a storage place.

Figure 8:
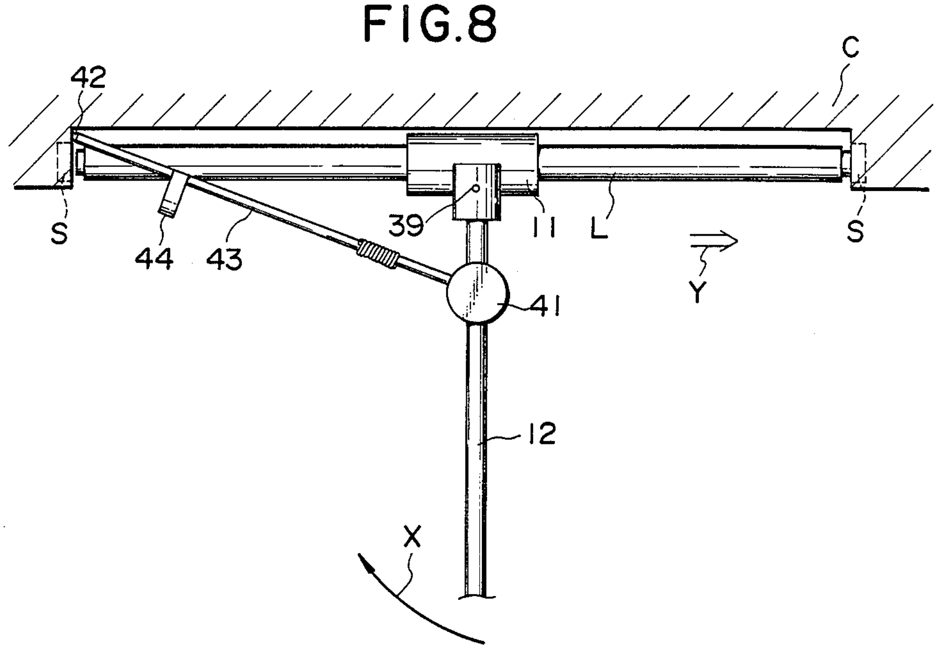
FIGS. 8 and 9 are views used to explain the mode of operation of the device shown in FIG. 7.
Figure 9:
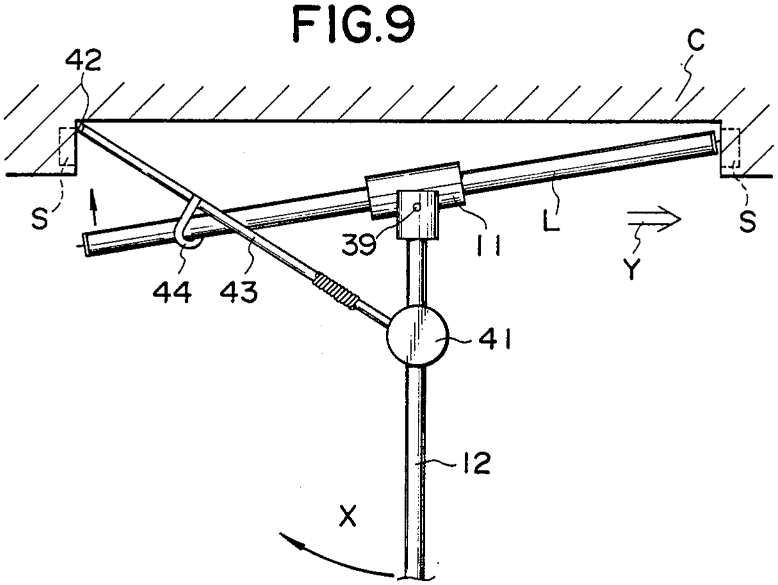

Third Embodiment, FIGS. 7 through 9

A third embodiment of the present invention will be described with reference to FIGS. 7, 8 and 9. This third embodiment of the invention is so designed and constructed that it is effective when the sockets for fluorescent lamps are embedded in a ceiling and that it can prevent a fluorescent lamp being removed or attached from falling off.

The lower end of each of a pair of auxiliary rods 43 is swingably attached to the supporting rod 12 in a manner substantially similar to that described in the second embodiment of the invention. That is, a knob 41 is rotatably supported on the supporting rod 12, and the proximal end of the auxiliary rod 43 is securely attached to the knob 41. As in the case of the second embodiment of the invention, the knob 41 is provided with an upper positioning pin (not shown) used to maintain the auxiliary rods 43 in a raised position as shown in FIG. 7 and a lower positioning pin (not shown) used to maintain the auxiliary rods 43 in a position in parallel with the supporting rod 12. A rubber slippage preventive member 42 is fitted on the upper end of each of the auxiliary rods 43. The auxiliary rods 43 are interconnected to each other by a U-shaped connecting member 44 (as shown in FIG. 7A) near the distal ends thereof so that the auxiliary rods 43 are maintained in parallel with each other. This U-shaped connecting member 44 also serves to hold one end of a fluorescent lamp being removed or attached so that the fluorescent lamp is prevented from falling off the supporting frame 11.

Next the mode of operation of the third embodiment of the invention of the above described construction will be described with reference to FIGS. 8 and 9. In the case of removal of a fluorescent lamp, the operator inflates the bag members 15 in the manner described above, thereby clamping the fluorescent lamp. Thereafter, the operator engages the outer distal ends of the auxiliary rods 43 with the side wall of a ceiling C in which is embedded a left socket S as shown in FIG. 8. Next the operator mcves the supporting rod 12 in the direction indicated by an arrow X so that the fluorescent lamp L is caused to move in the direction indicated by an arrow Y. As a result, a gap is produced between the left socket S and the left end of the fluorescent lamp L as shown in FIG. 8, and, when the operator lowers the supporting rod 12 under these conditions, the fluorescent lamp L can be easily removed.

Next the steps for attaching a fluorescent lamp will be described. First the operator clamps the fluorescent lamp in a manner substantially similar to that described above in such a way that, as shown in FIG. 9, the left end of a fluorescent lamp L is spaced apart from the outer ends of the auxiliary rods 43 by a specific distance and that the pins extending from the right end of the fluorescent lamp L are aligned with their corresponding pin receiving holes of the right socket S. Thereafter the operator inserts the pins of the fluorescent lamp L into the right socket S. Next the operator engages the outer ends of the auxiliary rods 43 with the left side wall of the ceiling C as shown in FIG. 9 and moves the supporting rod 12 in the direction X while raising it. Then the left portion of the fluorescent lamp L is raised by the connecting member 44 and is moved in the direction Y. When the operator returns the supporting rod 12 to its initial position after the left end of the fluorescent lamp L has been brought to a position in alignment with the left socket S, the fluorescent lamp L is securely held between the sockets S.

As described above, this third embodiment of the invention can remove an old fluorescent lamp from a high position or attach a new fluorescent lamp to a high position in a simple and easy manner with a small force. The removal or attachment of a fluorescent lamp can be equally accomplished even when the sockets for fluorecent lamps are embedded.

Fourth Embodiment, FIGS. 10 and 11

Referring next to FIGS. 10 and 11, a fourth embodiment of the present invention will be described. The inner or proximal ends of a pair of parallel auxiliary rods 53 are securely attached to a knob 51 which in turn is rotatably connected to the supporting rod 12, and a spacer 52 with a rubber plate 52*a* bonded thereto is interposed between the parallel auxiliary rods 53 at their outer or distal ends (FIG. 10A).

This fourth embodiment of the present invention is used mainly when the sockets S for a fluorescent lamp are suspended from the ceiling C.

For removing a fluorescent lamp L, the operator first raises the auxiliary rods 53 and securely holds them in a raised position. Next the operator raises the supporting rod 12 in such a way that the fluorescent lamp L is clamped by the supporting frame 11 in a manner substantially similar to that described above and at the same time the spacer 52 at the outer ends of the auxiliary rods 53 is brought into engagement with the outer or back surface of the left socket S. Thereafter the operator moves the supporting rod 12 in the direction indicated by an arrow X in FIG. 11 so that the fluorescent lamp L is caused to move in the direction indicated by an arrow Y because the spacer 52 is engaged with the left socket S. As a result, the right end of the fluorescent lamp L is separated from the right socket S, whereby the fluorescent lamp L can be easily removed.

For attaching a new fluorescent lamp, the operator first inserts the pins extending from the left end of the fluorescent lamp L into the pin receiving holes of the left socket S and engages the spacer 52 of the auxiliary rods 53 with the outer face of the left socket S as shown in FIG. 11. Next the operator moves the supporting rod 12 in the direction X so that a gap is produced between the right end of the fluorescent lamp L and the right socket S, whereupon the fluorescent lamp L can be easily inserted between the sockets S.

Figure 12:
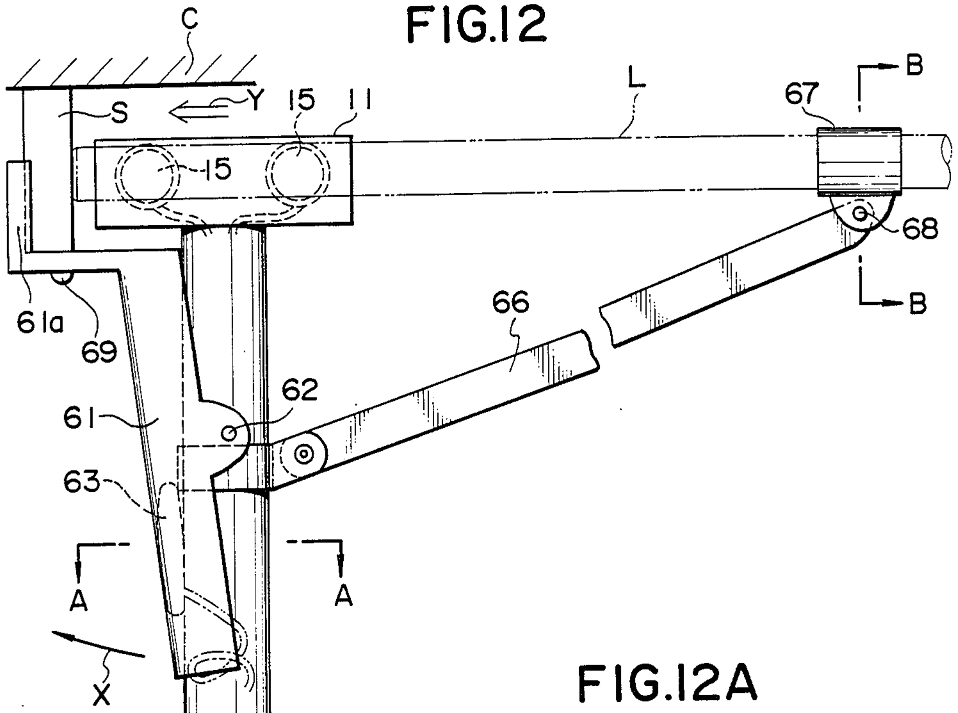
FIG. 12 is a front view, partly in section, of a fifth embodiment of the present invention.
Figure 12:
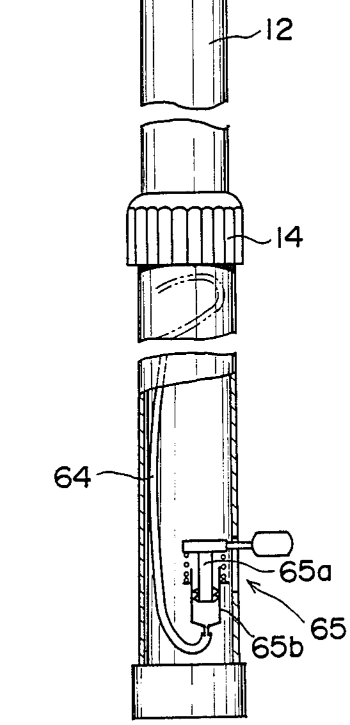

Fifth Embodiment, FIG. 12

Referring next to FIG. 12, a fifth embodiment of the present invention will be described. The fifth embodiment is substantially similar in construction to the first embodiment except that an auxiliary lever is further provided in order to facilitate the removal or attachment of a fluorescent lamp.

Figure 12A:
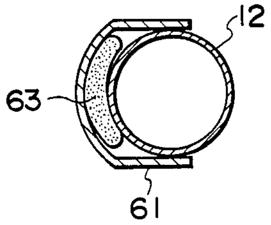
FIG. 12A is a sectional view taken along the line A—A of FIG. 12.

In this device, an auxiliary lever 61 is pivotably supported on the supporting rod 12 near the upper end thereof. The auxiliary lever 61 is connected to the supporting rod 12 in such a way that the auxiliary lever 61 clamps the supporting rod 12, and the outer or distal end 61*a* of the auxiliary lever 61 is bent in the form of the letter Z and is extended to a height almost equal to that of the supporting frame 11. The auxiliary lever 61 is pivoted at a point intermediate its ends on the supporting rod 12 by a pin 62, and, as best shown in FIG. 12A, an expandable and contractable bag member 63 is interposed between the supporting rod 12 and the lower portion of the auxiliary lever 61. The bag member 63 is communicated through a fluid (for instance, air) supply pipe 64 with a pump mechanism 65 disposed at the lower end portion of the supporting rod 12. The pump mechanism 65 comprises a piston 65*a* and a cylinder 65*b* and is manually operated, but it is to be understood that the pump mechanism 65 may be an electrically driven pump. Instead of the bag member 63, a piston-and-cylinder mechanism which extends and retracts itself may be used.

Figure 12B:
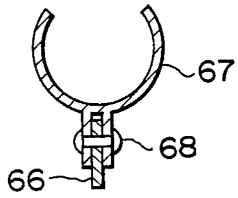
FIG. 12B is a sectional view taken along the line B—B of FIG. 12.

A supporting bar 66 is supported at its proximal end on the upper portion of the supporting rod 12 and extends in the direction opposite to the direction in which the auxiliary lever 61 extends. The supporting bar 66 is adapted to support the center portion of a fluorescent lamp L via a fluorescent lamp receiving member 67 pivoted by a pin 68 to the distal end of the supporting bar 66. As best shown in FIG. 12B, the receiving member 67 has an arcuate cross-section with an open top and is made of a flexible material so that the fluorescent lamp L can be inserted into the receiving member 67.

Next the mode of operation of this device of the above described construction will be described. First, for removing a fluorescent lamp, the operator engages the distal end 61a of the auxiliary lever 61 with the outer or back surface of the left socket S and clamps one end portion of the fluorescent lamp L with the bag members 15 while engaging the receiving member 67 with the other end portion of the fluorescent lamp L. Thereafter the operator drives the pump mechanism 65 so that the bag member 63 is inflated. The lower portion of the auxiliary lever 61 tends to move in the direction indicated by an arrow X, but the outer distal end 61*a* of the auxiliary lever 61 is in engagement with the left socket S. As a result of the reaction, the supporting rod 12 is caused to move in the direction opposite to the direction X. As a result, the fluorescent lamp L is caused to move in the direction indicated by an arrow Y, whereby the right end (not shown) of the fluorescent lamp L is separated from the right socket (not shown). Therefore, when the operator lowers the supporting rod 12, the fluorescent lamp L is easily removed from the sockets S.

For attaching a new fluorescent lamp, the operator first sets the distance between one end of the fluorescent lamp L and the auxiliary lever 61 and clamps the fluorescent lamp L by means of the bag members 15 and the receiving member 67 in such a way that the pins of the fluorescent lamp will be aligned with the pin receiving holes of the sockets S. Next the operator raises the supporting rod 12 so as to engage the distal end 61*a* of the auxiliary lever 61 with the outer back surface of the socket S. If a pilot lamp 69 is mounted on, for instance, near the distal end 61*a* of the auxiliary lever 61, the operator can readily determine whether or not the distal end 61a of the auxiliary lever 61 is in engagement with the socket S even when the socket S is located at a high position. The distal end 61*a* of the auxiliary lever 61, which is now in engagement with the socket S, serves to guide the fluorescent lamp L with respect to the socket S so that the pins of the fluorescent lamp can be correctly inserted into the pin receiving holes of the socket S.

Thereafter the operator drives the pump mechanism 65 while the distal end 61*a* of the auxiliary lever 61 is maintained in engagement with the socket S thereby to inflate the bag member 63. Then, as described before, the pins of the fluorescent lamp L are inserted into the pin receiving holes of the left socket S, and a gap is produced between the right end of the fluorescent lamp L and the left socket S. Therefore the operator can easily insert the fluorescent lamp L between the sockets S. Then, when the operator deflates the bag member 63, the fluorescent lamp L is securely held between the two sockets.

As described above, the removal or attachment of a fluorescent lamp can be accomplished in a simple and easy manner with this device of the fifth embodiment of the invention even when the conditions in a room do not permit a wide movement of the supporting rod and even if it is difficult to align a fluorescent lamp with its sockets because the fluorescent lamp is installed on an extremely high ceiling.

It has been described above that this device is used when the sockets S are suspended from the ceiling C, but it is to be understood that this device can be used with equal effectiveness even when the sockets S are embedded in a ceiling. In the latter case, the distal end 61*a* of the auxiliary lever 61 is so designed and constructed as to engage with the inner front surface of a socket S and the bag member 63 is located at a position opposite to that shown in FIG. 12 (on the right side of the supporting rod 12) so that the auxiliary lever 61 will be caused to move in the opposite direction.

Adapters for Positioning Fluorescent Lamp, FIGS. 13 through 19

FIGS. 13 through 19 show some adapters which may be used with the above-described devices for replacing a fluorescent lamp in order to determine the position of a fluorescent lamp.

In the case of removal or attachment of a fluorescent lamp with a device of any of the types described above, the pins extending from the ends of a fluorescent lamp must be correctly aligned with and inserted into the pin receiving holes of the sockets. However, when a fluorescent lamp is to be installed at a high position, it is very difficult for an operator to observe the positions of the pins of a fluorescent lamp with respect to the pin receiving holes of sockets and consequently to align the pins with the pin receiving holes.

An adapter in accordance with the present invention is used to facilitate the alignment of the pins of a fluorescent lamp with the corresponding pin receiving holes of a socket when the fluorescent lamp must be attached at a relatively high position. In general, this adapter comprises a fluorescent lamp holding member which is made of a flexible material and has an arcuate cross section and an engaging member which is adapted to be fitted over a socket for supporting a fluorescent lamp.

Figure 13:
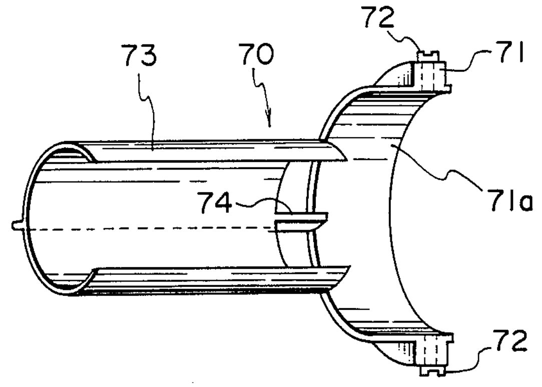
FIG. 13 is a top perspective view of a first example of an adapter for positioning a fluorescent lamp which is used with a device for replacing a fluorescent lamp in accordance with the present invention.
Figure 14:
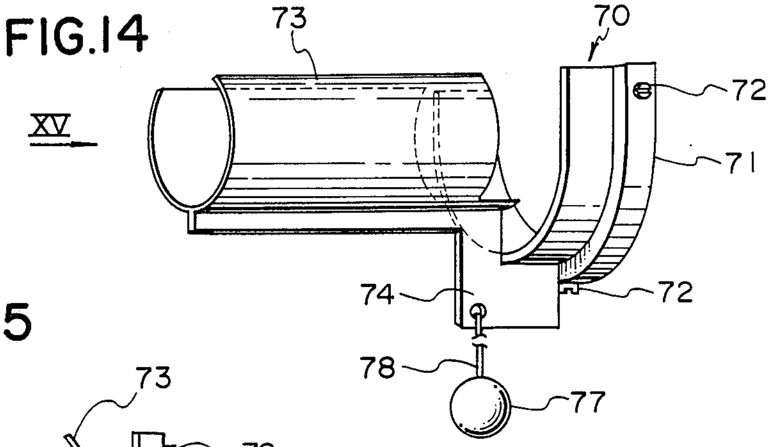
FIG. 14 is a side perspective view thereof.

FIGS. 13 and 14 show a first example of an adapter in accordance with the present invention. Reference numeral 71 designates a socket engaging member adapted to be fitted over a socket for supporting a fluorescent lamp. It has an inner wall surface 71*a* which has a substantially semicircular cross section by which it can be brought into intimate contact with the outer periphery of the socket. The socket engaging member 71 is made of a material which has a relatively great thickness and can resist deformation. The engaging member 71 has a plurality of equiangularly-spaced fine adjusting screws 72 which extend radially through the cylindrical wall of the engaging member 71, whereby, depending upon the shape (diameter) of a socket, the inner contact diameter of the socket engaging member 71 can be varied.

Figure 15:
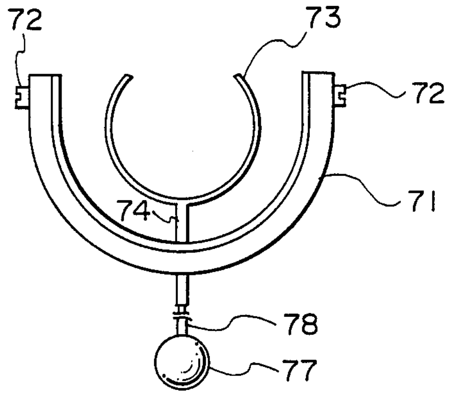
FIG. 15 is a view looking in the direction indicated by an arrow XV in FIG. 14.

Disposed backwardly of the socket engaging member 71 is a thin-wall, fluorescent lamp holding member 73 which is made of a flexible material and has an arcuate cross section. The holding member 73 has a rib 74 by which the holding member 73 is connected to the socket engaging member 71. The rib 74 serves also to hold the holding member 73 in a specific position with respect to the interior of the socket engaging member 71 (FIG. 15). The center of the lamp holding member 73 with respect to the center of the socket engaging member 71 is determined according to the positions of pin receiving holes of a movable member attached to a socket with respect to the center thereof. A ball 77 which is used when the adapter is removed is suspended by a thread 78 from the lower portion of the socket engaging member 71 or the rib 74.

Figure 16:
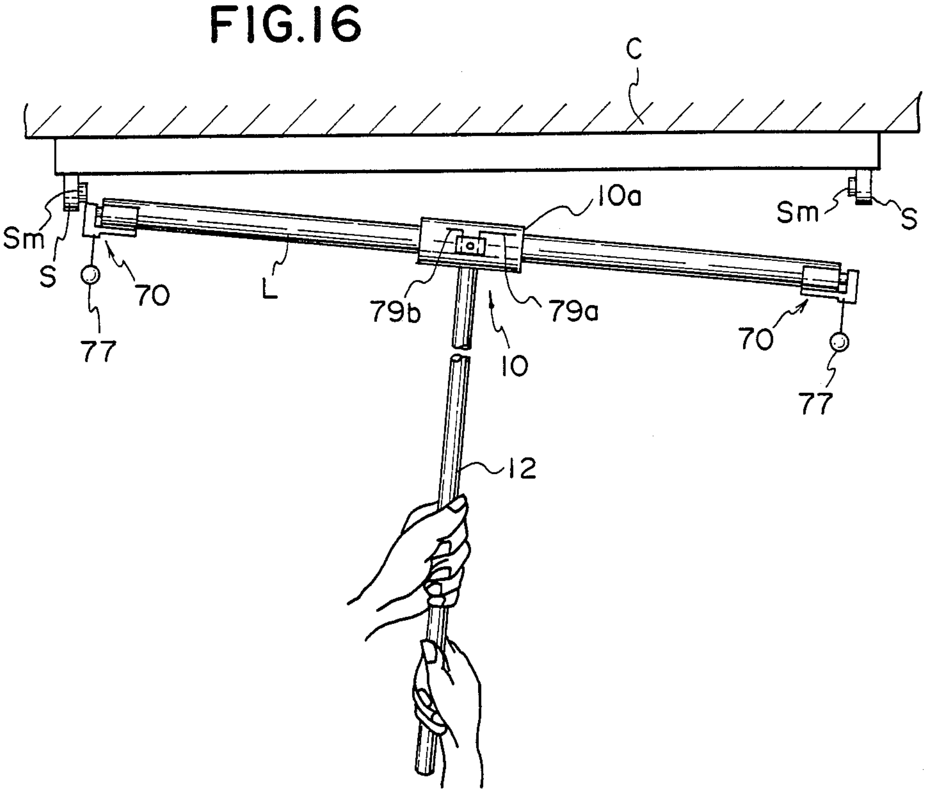
FIG. 16 is a view used to explain the mode of operation thereof.

FIG. 16 shows how a fluorescent lamp L is attached to its sockets S by using the adapters 70 in accordance with the present invention. The adapters 70 are attached to the ends of the fluorescent lamp L in such a way that the fluorescent lamp L is clamped and held in position by the lamp holding members 73. In this case, the directions of the pins P of the fluorescent lamp L are adjusted according to the positions of the pin receiving holes of the socket S. More particularly, when the socket S has a pair of pin receiving holes arranged in one horizontal row, the fluorescent lamp L is inserted into and clamped by the lamp holding member 73 in such a way that the pins P of the fluorescent lamp L are also arranged in one horizontal row. When the socket S has a pair of pin receiving holes arranged in one vertical row, the lluorescent lamp L is inserted into and clamped by the lamp holding member 73 in such a way that the pins P of the fluorescent lamp L are arrayed in one vertical row.

Figure 17:
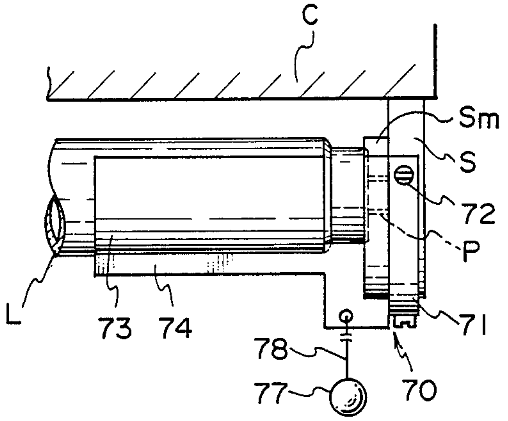
FIG. 17 is a partial side view illustrating the adapter attached to one end of a fluorescent lamp.

After the adapters 70 have been attached to the fluorescent lamp L in the manner described, the fluorescent lamp L is clamped by the device 10 for replacing a fluorescent lamp. Thereafter an operator raises the fluorescent lamp L to the position between the sockets S attached to the ceiling C and fits the socket engaging member 71 of the adapter 70 over the socket S. As a result, the adapter 70 is aligned with the socket S so that the pins P of the fluorescent lamp L are aligned with the pin receiving holes of the socket S. Thereafter the operator so moves the supporting rod 12 that one end of the fluorescent lamp L is pressed against one socket S. Then the movable member Sm of one socket S is retracted and a gap is produced between the other end of the fluorescent lamp L and the other socket S, whereupon the other end of the fluorescent lamp L can be easily engaged with the other socket. In this case, the socket engaging member 71 of the adapter 70 fits over the other socket, whereby the pins P of the fluorescent lamp can be automatically aligned with the pin receiving holes of the other socket S. Thus the fluorescent lamp L can be easily attached to the sockets as best shown in FIG. 17.

After the fluorescent lamp L has been attached in the manner described above, the operator pulls down the ball 77 so that the adapter 70 is separated from the socket S and the fluorescent lamp L. Means for engaging with the ball 77 and pulling it downward may be an elongated rod with a hook at the upper end thereof. Alternatively, a hook may be attached to the upper portion 10*a* of the device 10 for replacing a fluorescent lamp so that, after a fluorescent lamp has been installed, the adapters 70 are removed by engaging the hook with the ball 77. FIG. 16 shows a long L-shaped hook 79*a* and a short L-shaped hook 79*b* attached to the upper portion 10*a* in such a way that they can rotate through 90°. In operation, these L-shaped hooks 79*a* and 79*b* are rotated through 90° so that they are held parallelly relative to each other.

Figure 18:
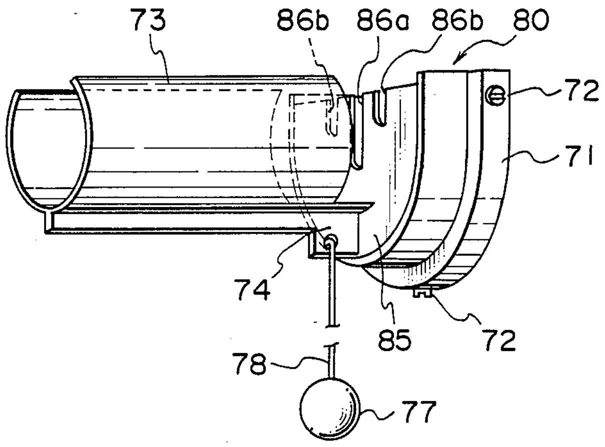
FIG. 18 is a perspective view of a second example of an adapter in accordance with the present invention.
Figure 18A:
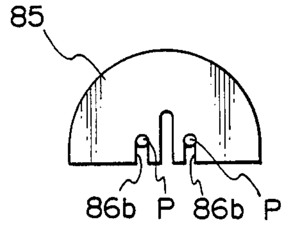
FIGS. 18A and 18B are top views of a pin retaining plate thereof.
Figure 18B:
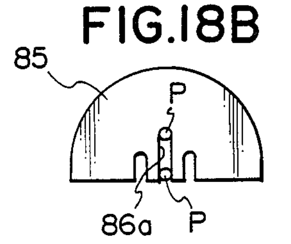

FIG. 18 is a perspective view of another example of an adapter in accordance with the present invention. The adapter designated generally by the reference numeral 80 is substantially similar in construction to the adapter described above with reference to FIGS. 13 through 17 except that the adapter 80 is further provided with a pin retaining plate 85. The pin retaining plate 85 consists of a thin semicircular plate about 0.5 mm in thickness and is disposed at the rear end of the socket engaging member 71. As best shown in FIGS. 18A and 18B, the pin retaining plate 85 is formed with a central slot 86*a* which is cut relatively deep from the center of the chord of the pin retaining plate 85 in the radial direction thereof and right and left slots 86*b* which are cut with relatively shallow depth in parallel with the central slot 86*a* and are symmetrical about the central slot 86*a*. The length (depth) of the central slot 86*a* and the distance between the right and left slots 86*b* are determined according to the distance of a pair of pins extending from each end of a fluorescent lamp.

When the adapters 80 are fitted over the ends of a fluorescet lamp L, the lamp L is fitted into and held by the lamp holding members 83 and the pins P of the fluorescent lamp L are inserted into the central slot 86*a* or the right and left slots 86*b* of the pin retaining plates 85 as shown in FIGS. 18B or 18A depending on the arrangement of the pin receiving holes of the sockets. That is, when the socket S has a pair of pin receiving holes arranged in one horizontal row, the pins P of the fluorescent lamp are inserted into the right and left slots 86*b*, respectively, as shown in FIG. 18A. On the other hand, when the socket S has a pair of pin receiving holes arranged in one vertical row, the pins P are inserted into the central slot 86*a* as shown in FIG. 18B.

After the adapters 80 have been attached to the ends of a fluorescent lamp L in the manner described above, the device for replacing a fluorescent lamp is used to mount the fluorescent lamp between the sockets S in the manner described above. Since the pins P are securely held in position by the pin retaining plates 85, they can be correctly inserted into the pin receiving holes of the sockets S.

So far the pin retaining plate 85 has been described as having the central slot 86*a* and the right and left slots 86*b*, but it is to be understood that the pin retaining plate may be formed only with the right and left slots 86*b* because almost all sockets for installing fluorescent lamps at high positions have a pair of pin receiving holes arranged in one horizontal row.

Figure 19:
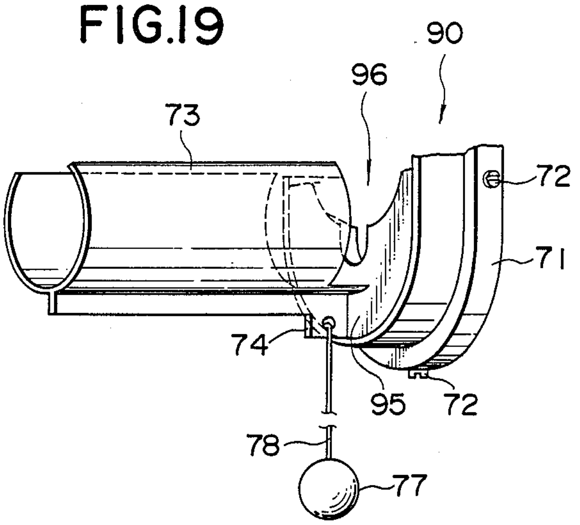
FIG. 19 is a perspective view of a third example of an adapter in accordance with the present invention.

FIG. 19 is a perspective view of a further example of an adapter in accordance with the present invention. The adapter 90 is substantially similar in construction to the adapter 70 described before with reference to FIGS. 13 through 17 except that the adapter 80 is further provided with a pin retaining plate 95 having a recess of a special shape. The pin retaining plate 95 is adapted to install a fluorescent lamp with elliptical bases at its ends. That is, the conventional fluorescent lamps have bases circular in cross section, but large-sized fluorescent lamps emitting a large quantity of light have bases M substantially elliptical in cross section as shown in FIGS. 19A and 19B, and a pair of pins P extend from the center of the base M.

The pin retaining plate 95 is therefore formed with a recess 96 whose shape is adapted to retain a base M substantially elliptical in cross section. As shown in FIGS. 19A and 19B, the recess 96 comprises a vertical or central semi-elliptical recess 96*a* whose major axis (long diameter) coincides with the vertical diameter of the semicircular pin retaining plate 95 and a horizontal semi-elliptical recess 96*b* whose major axis (long diameter) coincides with the chord of the semicircular pin retaining plate 95.

Figure 19A:
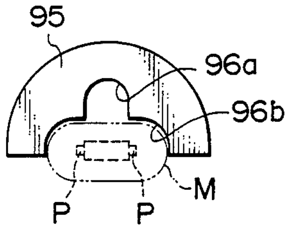
FIGS. 19A and 19B are top views of a pin retaining plate thereof.
Figure 19B:
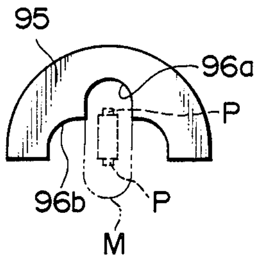

When a socket has a pair of pin receiving holes arranged in one horizontal row, the adapter 90 is attached to each end of a fluorescent lamp in such a way that the base M is fitted into the horizontal recess 96*b* as shown in FIG. 19A. On the other hand, when a socket has a pair of pin receiving holes arranged in one vertical row, the adapter 90 is attached in such a way that the base M is fitted into the vertical or central recess 96*a* as shown in FIG. 19B.

After the adapters 90 have been attached to the ends of a fluorescent lamp, an operator can easily and correctly install the fluorescent lamp between the sockets by using the device for replacing a fluorescent lamp in a manner substantially similar to that described above.

The adapters 90 of the type described above may be equally used for installing a fluorescent lamp with circular bases.

As described above, according to the present invention, an old fluorescent lamp can be replaced with a new fluorescent lamp in a simple and easy manner. Furthermore, it becomes possible to remove a fluorescent lamp from a high position or install a fluorescent lamp at a high position in a simple yet reliable manner. In the above description the pump mechanism has been described as being manually operated, but it is to be understood that a pump driven by a small electric motor can be used in the present invention.

What is claimed is:

1. An adapter for positioning a fluorescent lamp in an installation position thereof comprising:

a fluorescent lamp holding means made of a flexible material and having an acruate cross-section;

a socket engaging means adapted to be fitted over a socket of a lamp fixture, said socket supporting a fluorescent lamp in a predetermined orientation relative to said socket; and a pin retaining means for receiving and retaining terminal pins extending from an end of the fluorescent lamp.

2. An adapter for positioning a fluorescent lamp as set forth in claim 1, wherein said pin retaining means is comprised of a thin semicircular plate having a central slot and right and left slots which are cut in parallel with the central slot.

3. An adapter for positioning a fluorescent lamp as set forth in claim 1, wherein said pin retaining means is comprised of a thin semicircular plate having a semi-elliptical recess.

* * * * *